US010854115B1

(12) United States Patent
Zeuch et al.

(10) Patent No.: US 10,854,115 B1
(45) Date of Patent: Dec. 1, 2020

(54) COLLECTABLE CARD MOUNTING DEVICE AND METHODS OF USING

(71) Applicant: COMICLOCK, LLC, Wheaton, IL (US)

(72) Inventors: William L. Zeuch, Wheaton, IL (US); Thomas J. Lanagan, Wheaton, IL (US)

(73) Assignee: ComicLock LLC, Wheaton, IL (US)

( * ) Notice: Subject to any disclaimer, the term of this patent is extended or adjusted under 35 U.S.C. 154(b) by 0 days.

(21) Appl. No.: 16/103,811

(22) Filed: Aug. 14, 2018

(51) Int. Cl.
*G06F 1/12* (2006.01)
*G09F 1/12* (2006.01)

(52) U.S. Cl.
CPC .................................... *G09F 1/12* (2013.01)

(58) Field of Classification Search
CPC .. G09F 1/12; A47G 1/0611; A47G 2001/0666
USPC ................ 40/611.11, 644, 649, 795; D6/310
See application file for complete search history.

(56) References Cited

U.S. PATENT DOCUMENTS 2,224,586 A 12/1940 Abbot et al.
2,489,089 A 11/1949 Graff et al.
2,651,867 A * 9/1953 Prew ..................... A47G 1/162 40/781
3,541,714 A 11/1970 Bruck, Jr.
3,753,306 A 8/1973 Hemgren
3,846,925 A 11/1974 Busse
3,965,594 A 6/1976 Candor
3,977,112 A 8/1976 Breer, II
4,184,276 A * 1/1980 Hernandez ................ G09F 1/10 40/593
4,261,123 A 4/1981 Marriotti
4,364,192 A * 12/1982 Lloyd .................. A47G 1/0611 40/791
4,432,152 A * 2/1984 Daenen .................. A47G 1/142 40/762
4,702,025 A * 10/1987 Mace ................... A47G 1/0611 40/647
5,121,563 A 6/1992 Connor et al.
5,247,744 A * 9/1993 Ferris ......................... G09F 1/12 40/722
5,881,484 A * 3/1999 Carroll ....................... G09F 3/20 40/611.01
6,293,038 B1 9/2001 Chang
(Continued)

*Primary Examiner* — Joanne Silbermann
(74) *Attorney, Agent, or Firm* — Rollins IP

(57) ABSTRACT

A collectable card mounting device may include a rear wall, a pair of opposed arcuate side walls extending in a forward and outward direction from the rear wall and having a retaining lip for engaging a front surface of the collectable card. The side walls may further include a respective collectable card support member extending from each side wall at an angle. The mounting device may display a collectable on both vertical and horizontal surfaces. The arcuate side walls may define front and rear support ridges that support the device in a portrait orientation at a desirable viewing angle on a horizontal surface. A cover sheet may be dimensioned to extend beyond the width of the rear wall and support the device in a landscape orientation at a desirable viewing angle on a horizontal surface. The mounting device configuration provides an aesthetically desirable display of the collectable with only minimal visibility of the mounting device components and which may include a floating effect on a wall.

18 Claims, 8 Drawing Sheets

(56) References Cited

U.S. PATENT DOCUMENTS

| | | | |
|---|---|---|---|
| 7,055,275 B1 | 6/2006 | Teza et al. | |
| 9,578,979 B1 | 2/2017 | Zeuch et al. | |
| 10,251,496 B1 | 4/2019 | Zeuch et al. | |
| 2013/0247436 A1* | 9/2013 | Tolna | A47G 1/06 40/765 |

* cited by examiner

COLLECTABLE CARD MOUNTING DEVICE AND METHODS OF USING

BACKGROUND

1. Technical Field

The disclosure relates to mounting and display devices for collectable items, such as trading cards. The disclosure also relates to methods of using mounting and display devices.

2. Prior Art

Devices for displaying pictures, cards and other generally flat, indicia or image bearing articles are generally known. For example, various structures for mounting and securing such articles are described in U.S. Pat. No. 2,224,586 (Abbot et al.); U.S. Pat. No. 2,489,089 (Graff et al.); U.S. Pat. No. 3,541,714 (Bruck, Jr.); U.S. Pat. No. 3,846,925 (Busse); U.S. Pat. No. 3,977,112 (Breer); U.S. Pat. No. 5,121,563 (Connor et al.); U.S. Pat. No. 6,293,038 (Chang); and U.S. Pat. No. 7,055,275 (Teza et al.). In addition, various particular structures for securing or supporting such articles within a display device are described, for example, in U.S. Pat. No. 3,753,306 (Hemgren); U.S. Pat. No. 3,965,594 (Candor); U.S. Pat. No. 4,364,192 (Lloyd); and (U.S. Pat. No. 4,261,123 (Marriotti).

There are a number of challenges which have heretofore not been sufficiently met with prior art devices and methods. One challenge is to provide mounting devices that are relatively low in complexity and relatively low in manufacturing cost, while being durable and providing for easy installation of a collectable card. Other challenges relate to providing a visually effective display of the collectable which securely holds the item without risking damage to it and without detracting from its visual impact.

With particular regard to relatively small, often difficult to manipulate and mount trading cards, another challenge is to provide a mounting device and associated methods that are suitable for mounting a single card while being easy to control and manipulate during installation of the collectable card. A related challenge is to reduce the risk of damage to the collectable during mounting and while the collectable is displayed on the mounting device. Still another challenge is to provide mounting devices that may be utilized for aesthetically pleasing and stable mounting of collectables on a vertical surface, such as a wall, as well as on a horizontal surface, such as a table or shelf. Yet another challenge is to provide mounting devices that provide for display of a collectable in an upright or portrait orientation, with the major dimension vertical, as well as a sideways or landscape orientation, with the major dimension horizontal.

There is thus a need in the art for mounting and display devices and methods of using them, which address the aforementioned problems in the prior art. The subject matter of the present disclosure is directed to overcoming, or at least reducing the effects of, one or more of the problems or needs set forth above, and others.

SUMMARY

According to an aspect, a collectable card mounting device may include a rear wall, a pair of opposed side walls extending in a forward direction from the rear wall with each side wall having an arcuate shape and a retaining lip extending therefrom for engaging a front surface of the collectable card or a clear protective front cover sheet disposed in front of the collectable. The side walls may further include a respective collectable card support member extending from each side wall at an angle thereto and having a collectable card engaging end for engaging a rear surface of the collectable card and to enable mounting of varying thicknesses of collectables and protective sheets, and possibly other stacked components, such as mattes or frames. The rear wall may include a mounting aperture, which may permit mounting on a vertical surface in either a portrait or landscape orientation. The mounting device also provides for mounting of the collectable on a horizontal surface, in either a portrait or landscape orientation.

According to an aspect, the side walls may extend in at least a partial arcuate shape. The arcuate side wall shape provides for unique outward flexing of the side wall and without any substantial deformation or buckling in the rear wall, enabling the rear wall to retain a substantially flat appearance thus providing a desirable look in both wall and shelf mounting modes. The arcuate side wall shape provides a suitable amount of elastic inward retaining forces to be applied by the side walls to the edges of the protective front cover sheet to retain the protective front cover sheet in place without deforming it and without damaging the collectable. The arcuate side wall shape also defines front and back support ridges on the side walls, which may provide stable support and a slightly inclined display angle when the device rests on a horizontal surface in a portrait display orientation. The arcuate side wall shape securely retains the clear protective front cover sheet, which may be sized to extend beyond the width of the mounting device to provide a desired display angle in a landscape display orientation. In the landscape display orientation, the edge of the front cover sheet supports the front of the device and an edge of the rear wall supports the back of the device.

The mounting device configuration also results in an aesthetically desirable display of the collectable in which only minimal components of the mounting device are visible when the collectable is viewed from a head on direction, thus emphasizing, and not detracting from the aesthetic aspects of the collectable. Due in part to the arcuate shape of the side wall, the lateral dimensions of the retaining lips may extend beyond, and thus hide, the lateral dimension of the rear wall and the side walls. Thus, the mounting device does not detract significantly from the visual impact provided by the collectable itself. The components of the mounting device may also provide a unique "floating" effect when the collectable is displayed on a wall.

The dimensions of the protective front cover may be selected to provide for secure retention of the front cover in the mounting device and to engage the side walls. The dimensions of the protective front cover may be slightly larger than those of the collectable such that the collectable does not engage or absorb lateral forces from the mounting device, which could damage the collectable. Rather, the collectable is supported from behind by way of the support members, which may include rounded surfaces to provide sufficient forces to keep the collectable pressed against the protective front cover and secured, while preventing damage to the collectable.

The mounting device may be formed from an extrusion process using a thermoplastic whereby the elements of the mounting device are integrally molded in a simple, relatively inexpensive manufacturing operation.

DESCRIPTION OF THE DRAWINGS

The above and other attendant advantages and features of the disclosure will be apparent from the following detailed description together with the accompanying drawings, in which like reference numerals represent like elements throughout. It will be understood that the description and embodiments are intended as illustrative examples and are not intended to be limiting to the scope of disclosure, which is set forth in the claims appended hereto.

DETAILED DESCRIPTION

Figure 1:
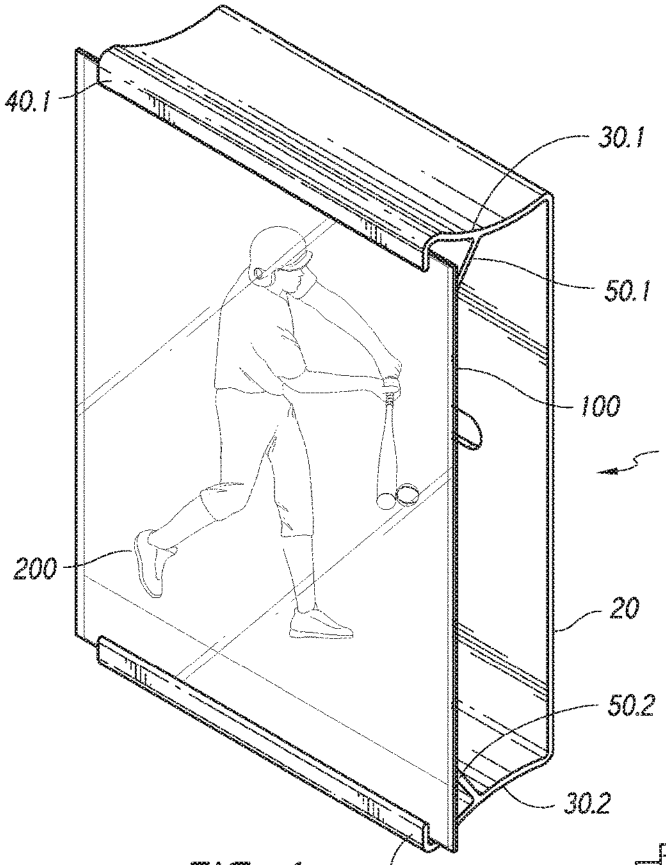
FIG. 1 is a front, right-side perspective showing a collectable card mounting device, collectable card and protective front cover sheet combination according to an aspect of the disclosure.
Figure 2:
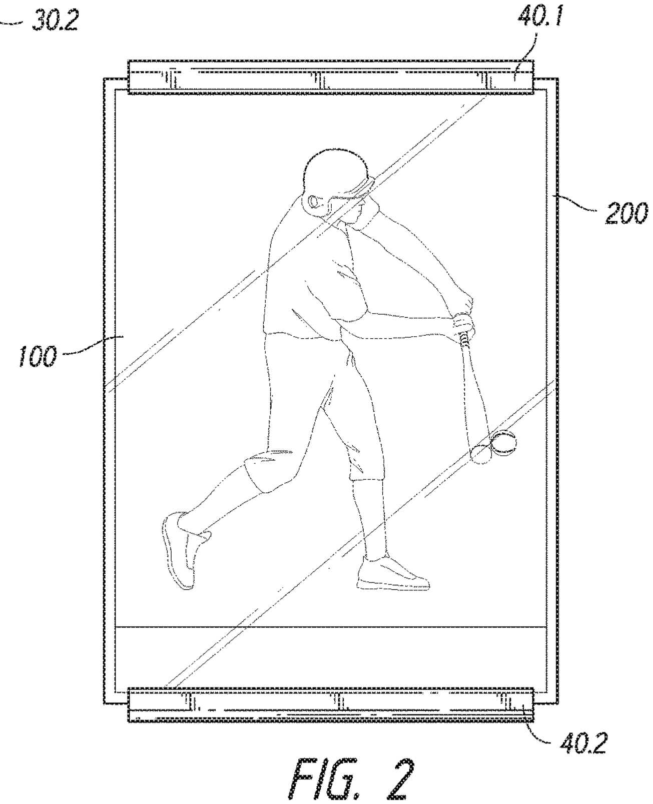
FIG. 2 is a front view of the collectable card mounting device, collectable card and protective front cover sheet.

Referring to FIGS. 1-11, a collectable card mounting device 10 may include a generally planar rear wall 20 and opposed end walls 30.1 and 30.2 extending in a forward and outward direction from the rear wall. As will be recognized, the constituent parts of mounting device 10 may be comprised of integral webs of predetermined thicknesses of thermoplastic, such as polyvinyl chloride (PVC), high-density polyethylene (HDPE), polycarbonate, polyamide, polystyrene or polypropylene, and may be formed in an extrusion process. Side walls 30.1 and 30.2 may be formed integrally with and may extend from the rear wall 20 to inwardly extending retaining lips or ridges 40.1 and 40.2 at an end opposite the rear wall 20. Retaining lips 40.1 and 40.2 may extend in a direction that is generally parallel to the planar extent of rear wall 20 and may be configured to overlap and retain the edges of a collectable card 100 within the mounting device 10. Rear surfaces 42.1 and 42.2 of the retaining lips 40.1 and 40.2 may engage a front surface of a clear protective front cover or sheet 200, which may be made from acrylic, polycarbonate or other plastic. The dimensions (height, width) of the cover sheet 200 are preferably selected to be slightly greater than those of the collectable. A mounting aperture 14 may be provided in the rear wall 20 to permit mounting on a hanger or nail affixed to a wall or vertical support surface. The mounting aperture 14 may include intersecting, elongated slots to provide for adjustable mounting on a vertical surface in both portrait and landscape orientations.

Figure 4:
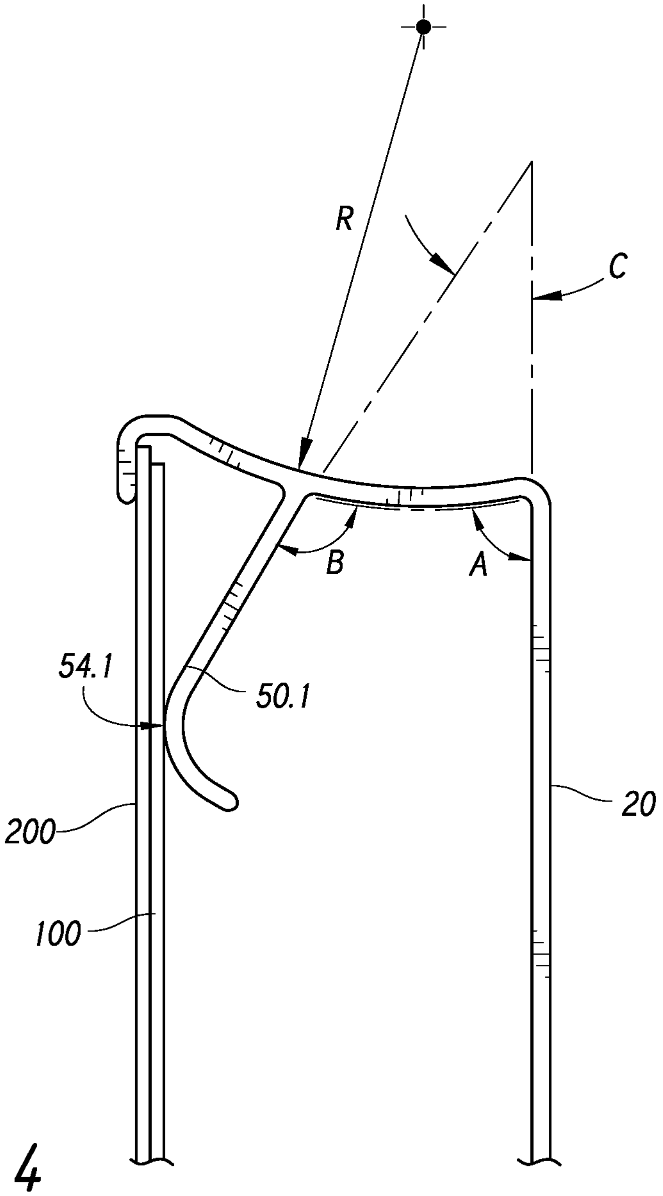
FIG. 4 is a right-side view showing additional geometric details.
Figure 5:
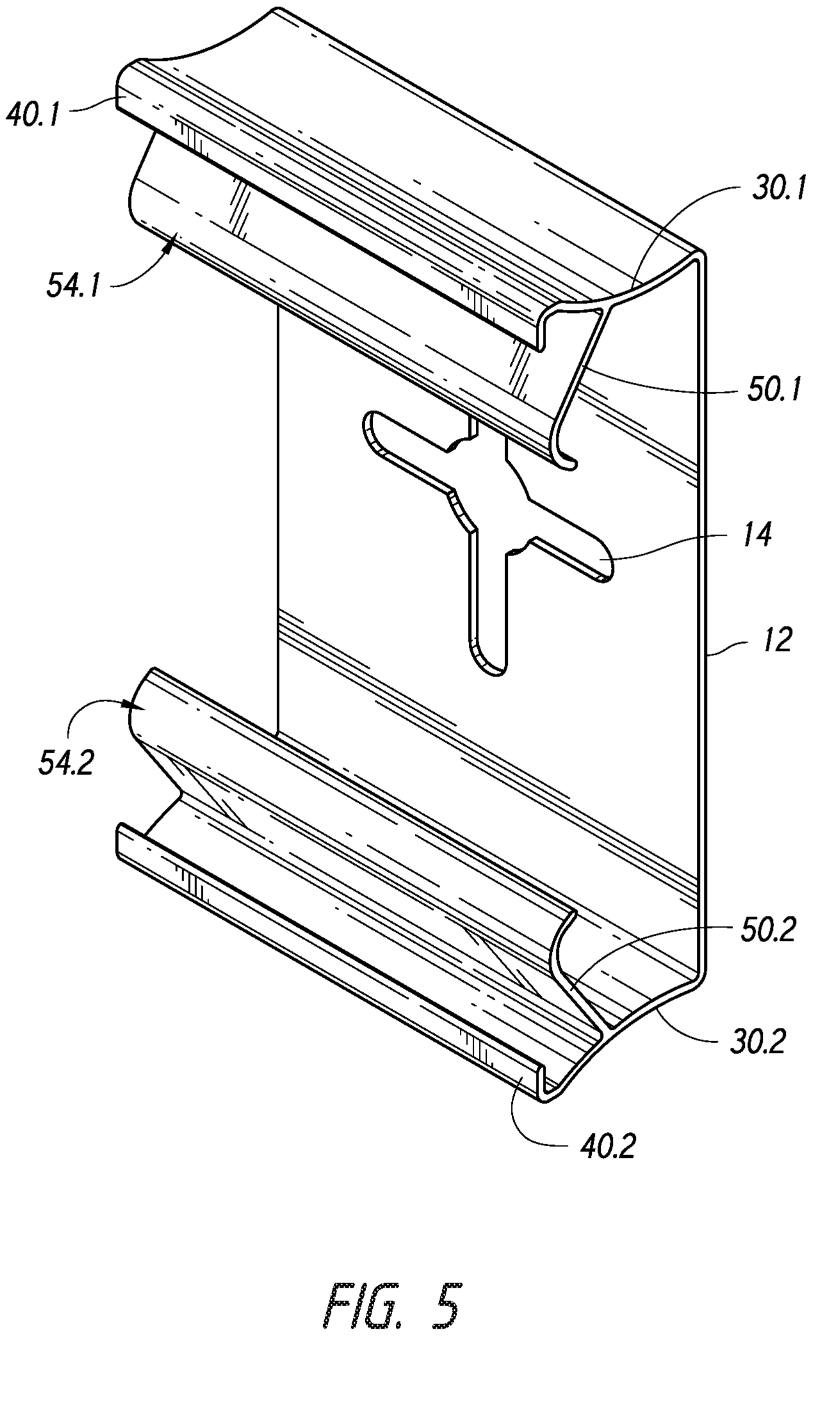
FIG. 5 is a front, right-side perspective view of a collectable card mounting device according to an aspect of the disclosure.
Figure 6:
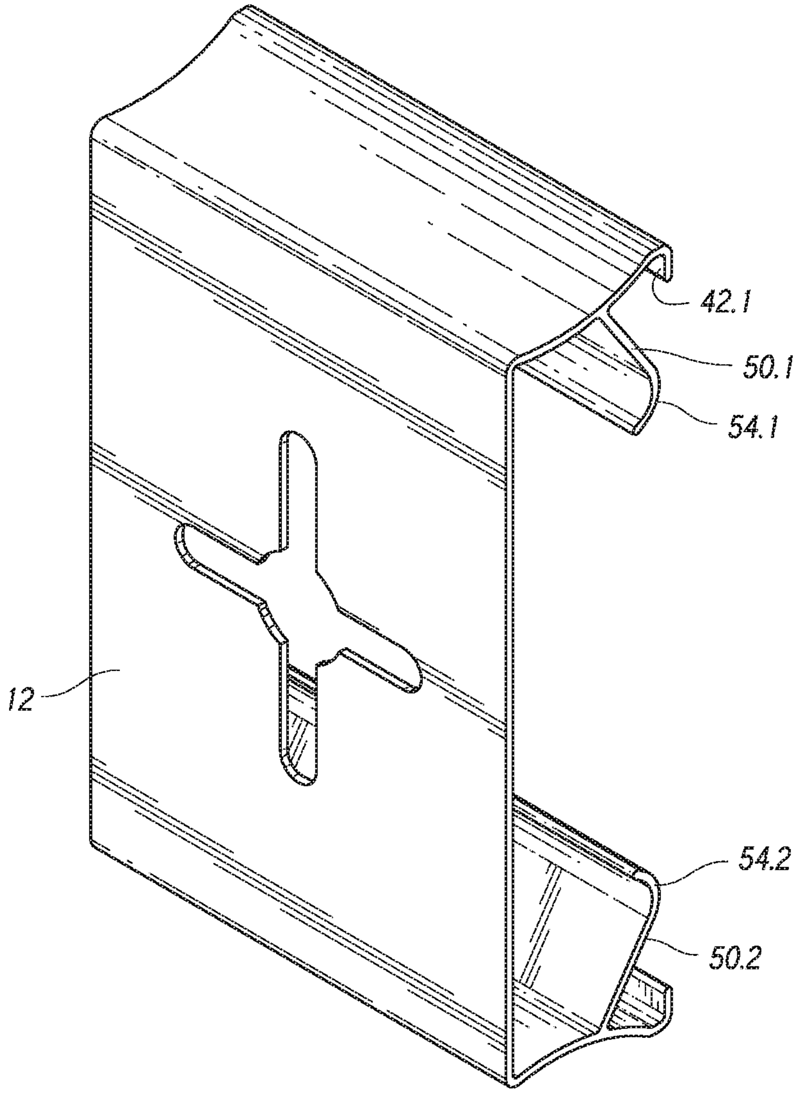
FIG. 6 is a rear left-side perspective view.

Referring additionally to FIG. 4, according to aspects of the disclosure, the side walls 30.1 and 30.2 may extend from the rear wall 20 in at least a partial arcuate path, with an initial angle "A" of slightly less than 90 degrees and having an internal radius on the corner of about 0.025 inches. The arcuate portion may have a radius "R" of about 1.0 inches and extend for about 45 degrees from the plane of the rear wall 20. Extending from the side walls 30.1 and 30.2 are respective support members 50.1 and 50.2, which provide support to a rear surface of the collectable card 100. Support members 50.1 and 50.2 may extend at an angle "B" (to a tangent of the arcuate surface of the side wall) of about 121 to 125 degrees from the side walls. Support members 50.1 and 50.2 also may form an angle "C" of about 30 to 35 degrees with the plane of the rear wall 20. Support members 50.1 and 50.2 may be formed with a curved surface 54.1 and 54.2 (see FIGS. 5 and 6) on a card-engaging end thereof. The curved surfaces enable sufficient support forces to be applied to the collectable while preventing damage to the rear surface of the collectable. Curved surfaces also prevent damage to the collectable during installation and make installation easier. The support members 50.1 and 50.2 and retaining lips 40.1 and 40.2 may extend along the entire width of the mounting device (as best shown in FIG. 5) and may be formed integrally therewith in an extrusion process.

The arcuate shape of the side walls provides an ergonomically desirable gripping area on the outer surfaces 32.1 and 32.2 of the side walls, which permit a user to grip the device 10 in one hand, preferably applying force with the thumb on one side wall and fingers on the opposite side wall. Also, according to aspects of the disclosure, the respective support members 50.1 and 50.2, which provide rear surface support of and may provide a biasing force against the collectable 100, opposite the retaining force provided by retaining lips 40.1 and 40.2, to secure the collectable in the device 10. As will be explained, the combination of the geometry of the side wall and the geometry of the support members provide for unique support and operable characteristics of the device 10.

Figure 3:
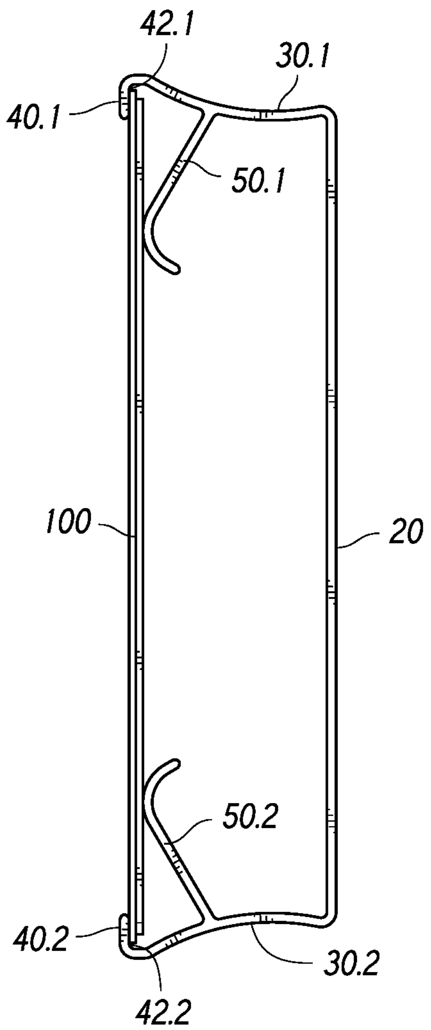
FIG. 3 is a right-side view of a collectable card mounting device according to an aspect of the disclosure.

As best shown in FIGS. 3 and 4, the side walls extend in a forward and outward direction from the rear wall 20, such that the span between the outer surfaces of the retaining lips 40.1 and 40.2 is greater than the span of the rear wall 20 in the same direction. This configuration is advantageous in concealing the rear wall 20 and the side walls 30.1 and 30.2 when the device 10 is used to display a collectable on a wall. In other words, the configuration provides only minimal exposure of the mounting device 10 inasmuch as the retaining lips 40.1 and 40.2 are the only visible elements of the device 10 when the collectable is viewed from a head on viewing point. In addition, the collectable appears to "float" on the wall or surface on which it is mounted. These aspects result in a unique, aesthetically pleasing display of the collectable which does not detract from its visual impact.

Figure 7A:
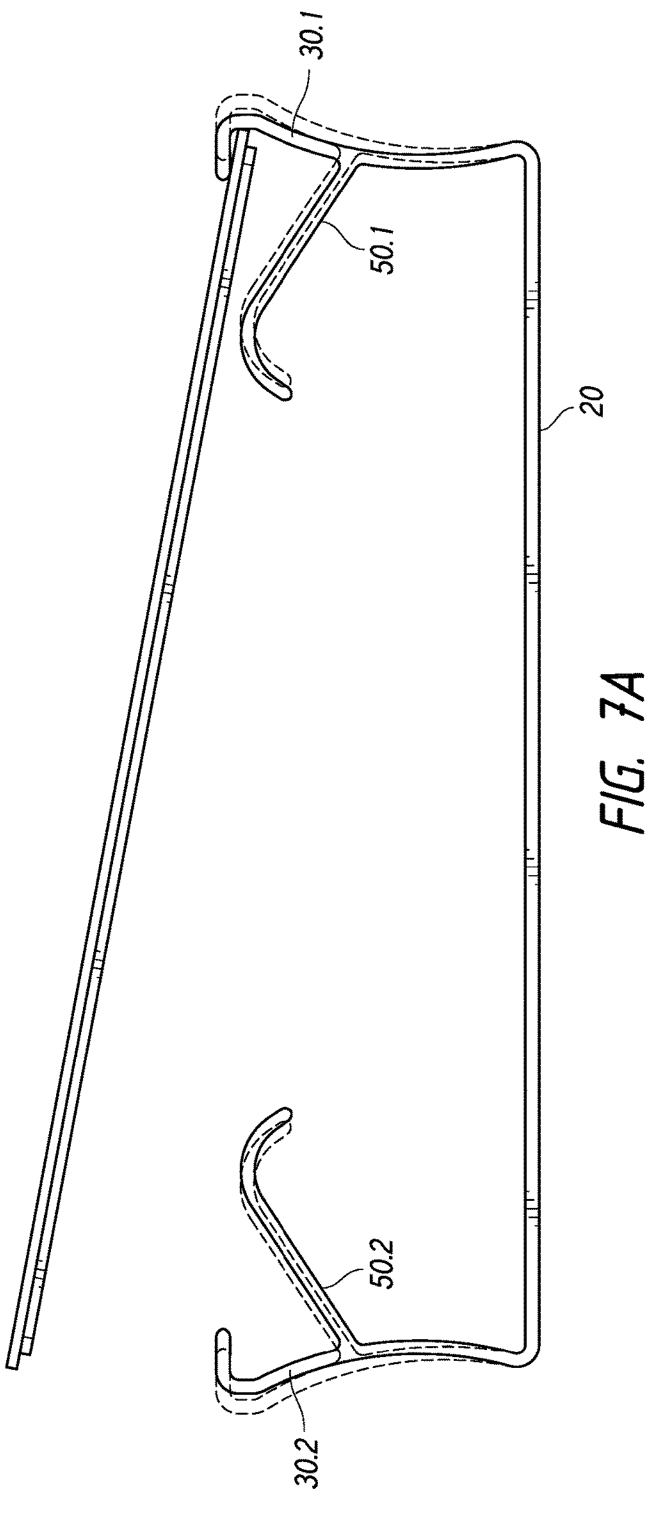
FIGS. 7A and 7B illustrate a right-side view of, and a method of operating a collectable card mounting device to install a collectable card therein.
Figure 7B:
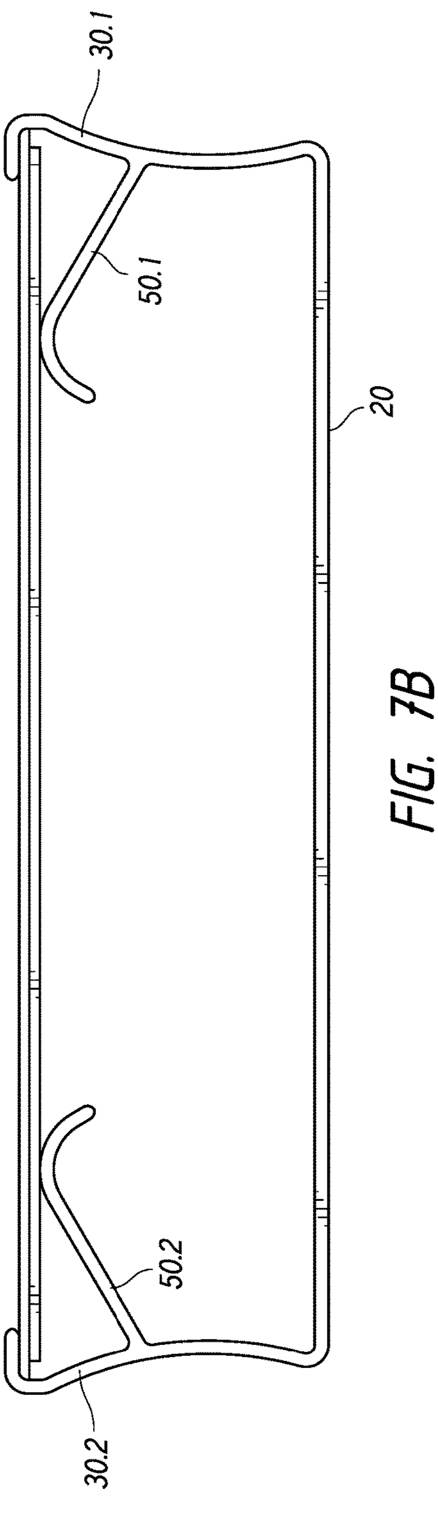

Referring additionally to FIGS. 7A and 7B, the mounting device configuration, including the configuration of the side walls 30.1 and 30.2 and support members 50.1 and 50.2 facilitate ease of installation of a collectable card while providing secure support of the collectable once installed. A user may position the collectable card 100 behind the clear front cover 200 and then insert one edge of the cover 200 at a slight angle beneath the retaining lip 40.1 as shown in FIG. 7A. The side wall 30.1 may flex slightly to the position shown in dashed lines in FIG. 7A as the user applies force to the cover sheet and the cover sheet edge engages the side wall 30.1. The opposite side of cover sheet 200 and collectable 100 are then pivoted downward. As this occurs, an outward force may be applied by the user on the side wall 30.2 to enable the left edge of the cover sheet 200 to clear the retaining lip 40.2. As the cover sheet 200 and collectable 100 are pivoted to an installed position, shown in FIG. 7B, the support members 50.1 and 50.2 may flex slightly downward and a "click" sound may be generated as the retaining lip 40.2 snaps back to position. The support members 50.1 and 50.2, having been flexed slightly downward as the cover sheet 200 and collectable 100 are installed thereby apply a force against the back surface of the collectable 200, retaining it in position against the cover sheet 200, which is, in turn, retained in position between the side walls 30.1 and 30.2 by the retaining lips 40.1 and 40.2.

Figure 8:
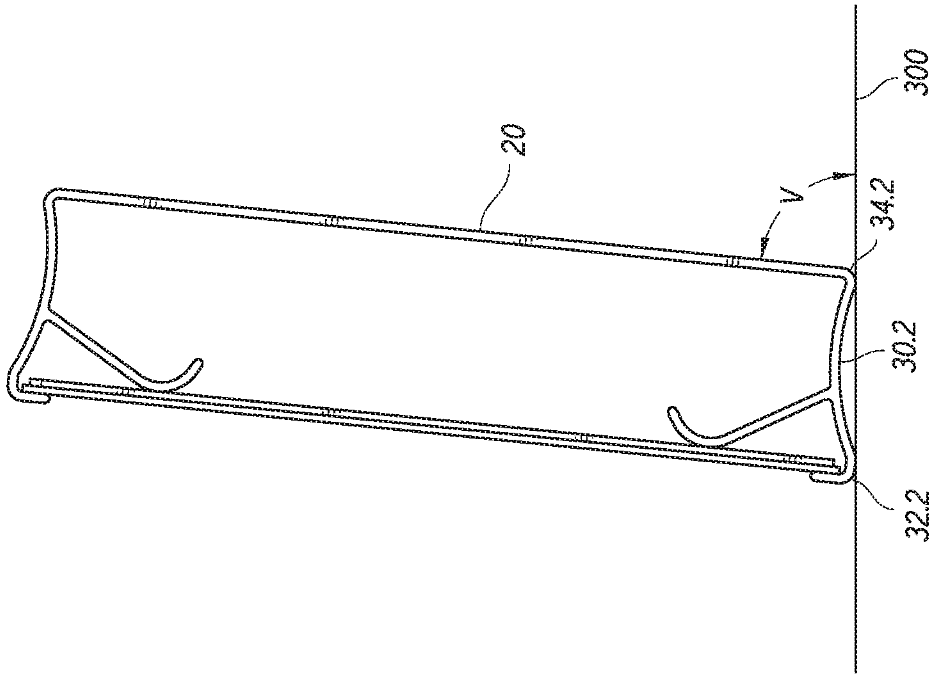
FIG. 8 is a right-side view of a collectable card mounting device supported on a horizontal surface in a portrait orientation.

FIG. 8 illustrates a side view of a mounting device resting on a horizontal surface 300 and displaying a collectable in a portrait orientation (i.e., with its major dimension vertical). As will be recognized, the arcuate side wall 30.2 may define a front supporting ridge 32.2 and a rear supporting ridge 34.2. The front supporting ridge 32.2 may be offset from the rear supporting ridge 34.2 such that the device rests on the horizontal surface with the rear wall 20, and the collectable 100 displayed a desired viewing angle "V", which may be about 80 degrees.

Figure 9:
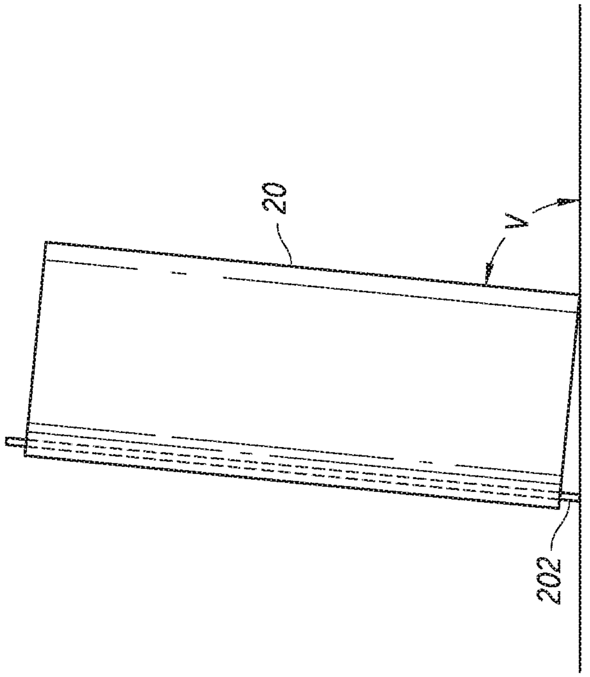
FIG. 9 is a right-side view of a collectable card mounting device supported in a landscape orientation.

FIG. 9 illustrates a side view of a mounting device resting on a horizontal surface 300 and displaying a collectable in a landscape orientation (i.e., with its major dimension horizontal). The protective cover sheet 200 may extend beyond the lateral dimension of the mounting device and thus provide a front supporting ridge 202. The edge of the rear wall 20 forms a rear supporting ridge. The lateral dimension (width) of the cover sheet 200 may be selected to provide a viewing angle "V" of about 80 degrees for the collectable when the device rests on the horizontal surface 300 in the landscape orientation. The width of the cover sheet may be 2.63 inches and the rear wall width may be 2.34 inches and the distance between the cover sheet and rear wall may be 0.78 inches, for example, to achieve the desired viewing angle.

Figure 10:
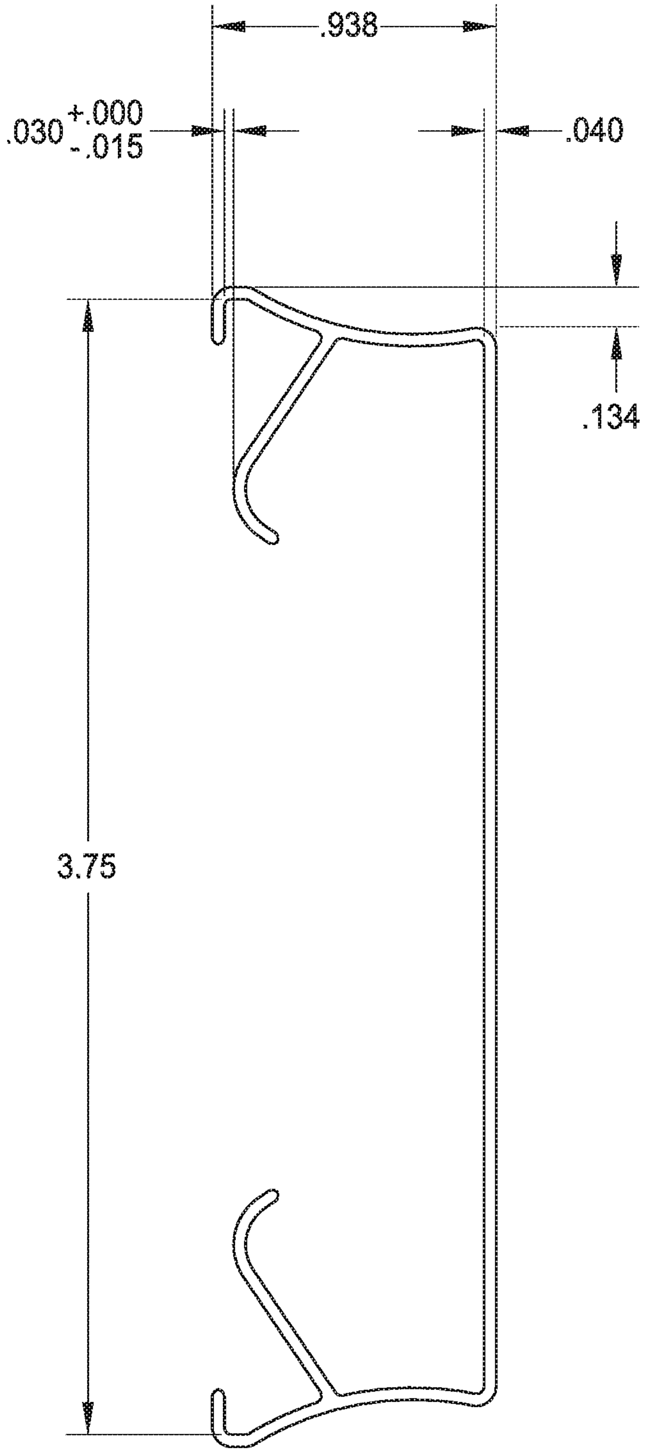
FIG. 10 is a right-side view of a collectable card mounting device showing particular dimensions found to be advantageous.
Figure 11:
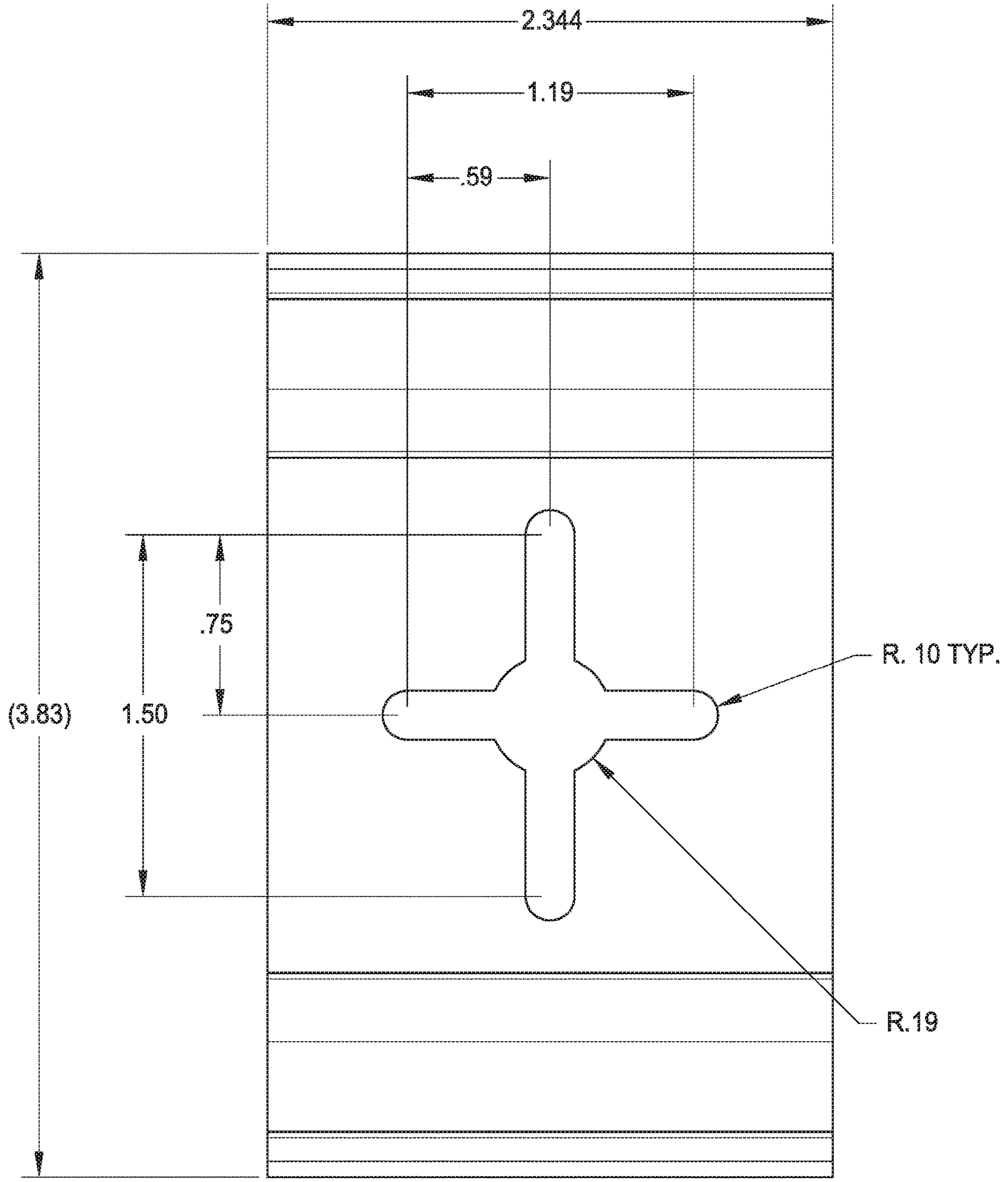
FIG. 11 is a front view of the collectable card mounting device showing particular dimensions found to be advantageous.

Referring more particularly to FIGS. 10 and 11, applicant has found particular dimensions to be advantageous for use of the mounting device with a standard trading card, which typically has dimensions of about 2.5 inches by 3.5 inches. An advantageous configuration of the mounting device may include a web thickness for the rear wall, side walls and support members of about 0.040 inches for an implementation using extruded polyvinylchloride (PVC) as a material. The width of the mounting device may be about 2.34 inches and the lateral span between the outer edges of the side walls may be about 3.83 inches. The rear wall height may be about 3.56 inches. A clearance of about 0.030 inches may be provided between the rear surface of the retaining lip and the most-forward extent of the curved surfaces 54.1 and 54.2 on the support members 50.1 and 50.2. The span between the inner surfaces of the side walls at a point just below the rear surfaces of the retaining lips may be about 3.75 inches. The height of the side walls may be about 0.938 inches and the side walls may extend in an outward, lateral direction from the rear wall by about 0.134 inches. Applicant has found these dimensions to provide an advantageous balance of the firmness by which the device secures the collectable and the forces required to operate the device during installation of the collectable.

It should be understood that implementation of other variations and modifications of the disclosure in its various aspects may be readily apparent to those of ordinary skill in the art, and that the disclosure is not limited by the specific embodiments described herein. It is therefore contemplated to cover, by the present disclosure any and all modifications, variations or equivalents. For example, the support members and other components, such as the tensioning member, may be formed or fabricated from materials other than the particular plastic materials described, including metals, such as aluminum or steel, or other materials. Moreover, the support members and other components may be made by processes other than extrusion, such as stamping or injection molding.

The invention claimed is:

1. A collectable card mounting device for supporting a collectable card comprising:

a rear wall;

a pair of opposed side walls extending in a forward direction from the rear wall, at least one of the side walls extending in an arcuate shape and defining a front support ridge and a rear support ridge, the front support ridge being offset from the rear support ridge such that the mounting device, when supported on the front support ridge and rear support ridge on a horizontal surface, displays the collectable card at a viewing angle of less than 90 degrees to the horizontal support surface;

each side wall having a retaining lip extending therefrom for engaging a front surface of the collectable card; and a collectable card support member extending from each side wall and having a collectable card engaging end for engaging a rear surface of the collectable card.

2. The mounting device of claim 1, wherein the collectable card support members are configured to apply a biasing force to a rear surface of the collectable card when the collectable card extends between the retaining lips.

3. The mounting device of claim 1, wherein each collectable card engaging end includes an arcuate portion.

4. The mounting device of claim 1, wherein a base portion of each side wall is proximate the rear wall and extends at an initial angle of less than 90 degrees from the rear wall, and wherein a distal portion of the side wall is distal from the rear wall and extends at an angle of more than 90 degrees from the rear wall.

5. The mounting device of claim 1, wherein the side walls extend in an arc having a radius of 1 inch and extend 45 degrees from a plane defined by the rear wall.

6. The mounting device of claim 1, wherein the retaining lips each have a surface that extends parallel to the rear wall.

7. The mounting device of claim 1, wherein the retaining lips have a rear surface for engaging a front cover sheet, wherein at least one of the support members is adapted to flex towards the rear wall and apply a biasing force against the back surface of a collectable when the cover sheet and collectable are disposed adjacent the rear surfaces of the retaining lips.

8. The mounting device of claim 1, wherein the support members are formed integrally with respective ones of the side walls.

9. The mounting device of claim 1, wherein the side wall forms an arc with a radius of 1 inch.

10. The mounting device of claim 1, wherein the support members extend at an angle of 34 degrees to the rear wall.

11. The mounting device of claim 1, wherein the support members have a curved surface for engaging a back surface of the collectable.

12. The mounting device of claim 1, wherein the front support ridge is offset from the rear support ridge such that the mounting device, when supported on the front support ridge and rear support ridge on a horizontal surface displays the collectable at a viewing angle of 80 degrees to the horizontal support surface.

13. The mounting device of claim 1, further comprising a cover sheet secured between the side walls, the cover sheet extending laterally beyond the width of the rear wall such that an edge of the cover sheet and an edge of the rear wall support the device on a horizontal surface at a viewing angle of 80 degrees to the horizontal surface.

14. A method of using a mounting device for a collectable, the mounting device comprising a rear wall, a pair of opposed side walls extending in a forward direction from the rear wall; at least one of the side walls extending in an arcuate shape and defining a front support ridge and a rear support ridge, the front support ridge being offset from the rear support ridge, each side wall having a retaining lip extending therefrom for engaging a front surface of the collectable; a collectable support member extending from each side wall and having a collectable engaging end for engaging a rear surface of the collectable, the method comprising:

placing the collectable adjacent a cover sheet;

placing a first edge of the cover sheet under a first one of the retaining lips;

applying a lateral outward force to one of the side walls to flex the one side wall away from the other side wall;

placing a second edge of the cover sheet under a second one of the retaining lips;

slightly deflecting the support members to apply a force against a back surface of the collectable;

securing the cover sheet and collectable in the device between the side walls; and supporting the mounting device on a horizontal surface such that the front support ridge and rear support ridge engage the horizontal surface and the collectable is displayed at a viewing angle of less than 90 degrees to the horizontal support surface.

15. The method of claim 14, further comprising the step of supporting an edge of the cover sheet and an edge of the rear wall on a horizontal surface such that the mounting device is supported at a viewing angle of 80 degrees to the horizontal surface.

16. The method of claim 14, further comprising the step of supporting the mounting device at a viewing angle of 80 degrees to the horizontal surface.

17. A collectable card mounting device comprising:

a rear wall;

a pair of opposed side walls extending in an arcuate shape from the rear wall, such that one of the side walls may support the mounting device on a horizontal surface at a viewing angle that is less than 90 degrees relative to the horizontal surface;

a collectable card support member extending from each side wall and having a collectable card engaging end for engaging a rear surface of the collectable card, a cover sheet secured between the side walls, the cover sheet extending laterally beyond the width of the rear wall such that an edge of the cover sheet and an edge of the rear wall may support the device on a horizontal surface at a viewing angle that is less than 90 degrees relative to the horizontal surface.

18. The mounting device of claim 17, wherein the side walls define a front support ridge and a rear support ridge, the front support ridge being offset from the rear support ridge such that the mounting device, when supported on the front support ridge and rear support ridge on a horizontal surface displays the collectable at a viewing angle that is less than 90 degrees relative to the horizontal support surface.

* * * * *